United States Patent [19]

Spencer

[11] Patent Number: 4,985,122
[45] Date of Patent: Jan. 15, 1991

[54] VACUUM DISTILLATION APPARATUS AND METHOD WITH PRETREATMENT

[75] Inventor: Colin W. Spencer, Bilgola, Australia

[73] Assignee: Vaqua Limited, Frenchs Forest, Australia

[21] Appl. No.: 294,486

[22] Filed: Dec. 16, 1988

[30] Foreign Application Priority Data

Jun. 18, 1986 [AU] Australia .................... PH6512

[51] Int. Cl.$^5$ .................... B01D 3/10; C02F 1/04; C02F 1/20
[52] U.S. Cl. .................... 203/11; 203/21; 203/26; 203/39; 203/91; 203/DIG. 4; 203/DIG. 11; 203/DIG. 14; 203/DIG. 18; 203/DIG. 25; 55/189; 55/193; 55/194; 55/196; 202/176; 202/181; 202/202; 202/205
[58] Field of Search ........... 202/176, 177, 205, 181, 202/185.2, 202, 175, 236; 203/11, 39, 91, 90, DIG. 11, DIG. 14, DIG. 25, 21, 23, 25, 26, 27, 49, DIG. 17, DIG. 18, 100; 55/192, 193, 194, 196, 189; 210/188

[56] References Cited

U.S. PATENT DOCUMENTS

| | | | |
|---|---|---|---|
| 585,365 | 6/1897 | Skiffington | 202/185.2 |
| 2,570,171 | 10/1951 | Von Kohorn et al. | 55/193 |
| 2,979,156 | 4/1961 | Sebald | 55/193 |
| 3,300,392 | 1/1967 | Ross et al. | 202/176 |
| 3,468,761 | 9/1969 | Stalcup | 202/176 |
| 3,725,206 | 4/1973 | Foley | 202/181 |
| 3,826,718 | 7/1974 | Takayasu | 202/181 |
| 3,885,390 | 5/1975 | Scheerer | 55/196 |
| 4,030,985 | 6/1977 | Barba et al. | 203/11 |
| 4,181,577 | 1/1980 | Foley | 202/181 |
| 4,366,030 | 12/1982 | Anderson | 203/11 |
| 4,381,971 | 5/1983 | Dietrick | 203/DIG. 14 |
| 4,696,718 | 9/1987 | Lasater | 202/176 |
| 4,698,136 | 10/1987 | El-Allawy | 202/176 |
| 4,724,048 | 2/1988 | Helmich | 202/176 |

FOREIGN PATENT DOCUMENTS

955976 9/1982 U.S.S.R. .................... 55/196

Primary Examiner—Wilbur Bascomb
Attorney, Agent, or Firm—Beveridge, DeGrandi & Weilacher

[57] ABSTRACT

Method and apparatus for separating volatile contaminants from a liquid to be continuously distilled. A continuous still comprises evaporator (1) having a heating coil (2), and condensor coil (6), and distillate collector (5). An entrainment device (11) removes distillate (13) from collector (5) via line (10) and reduces pressure in evaporator (1). Feed liquid (21) containing volatile contaminants is charged batchwise to a pre-chamber (20) at sub-atmospheric pressure which is then sealed (valve 22) from feed supply (21). Volatile contaminants are extracted from the charge in prechamber (20) via line (26) and entrainment device (32). Pre-chamber (20) is subsequently placed in communication (via valve 25) with evaporator (1) whereby to equilibrate pressure between evaporator (1) and pre-chamber (20). Liquid levels in pre-cheamber (20) and evaporator (1) then equilibrate whereby decontaminated liquid is automatically transferred (line 36) from the pre-chamber (20) to evaporator (1) to make up for distillate removed from evaporator (1). Valve (25) is then closed and the cycle repeated. The valves are automatically operated in a timed sequence.

18 Claims, 2 Drawing Sheets

VACUUM DISTILLATION APPARATUS AND METHOD WITH PRETREATMENT

TECHNICAL FIELD

This invention relates to apparatus for and a method of separation of liquids in a mixture when the liquids have differing boiling points.

The invention will be described with particular reference to water purification or desalination but it will be understood not to be limited to that use.

BACKGROUND ART

Australian Patent 495,414 describes apparatus for purification of water by continuous vacuum distillation. Distillation separates water from dissolved solids, for example salts, and from higher boiling point substances which are concentrated in the still residue. However, in a continuous distillation process, a substance of lower boiling point than water which is present in the feed may be vaporised in the still and condensed along with the water distillate. A number of insecticides and other organic pollutants now frequently occur in water obtained from natural sources and such low boiling contaminants may not be satisfactorily removed during conventional continuous distillation.

Conventionally low boiling contaminants are removed by subjecting water to batch distillation in a still. The contaminants boiling at a lower temperature than water are first removed as volatiles. Temperature is then increased to vaporise water. The first water fraction obtained is used to purge the condensor system and must be rejected, subsequent water fractions being retained.

Batch distillation methods are relatively expensive to conduct in comparison with continuous distillation. An object of the present invention is an improved method for continuous distillation which enables removal of low boiling volatiles from a higher boiling distillate and which is more efficient than batch distillation systems. Preferred embodiments of the invention are of relatively low capital cost and/or operating cost and operate at high efficiency.

DISCLOSURE OF THE INVENTION

According to one aspect the present invention consists in a method for pre-treating a liquid to be supplied to the evaporator of a continuous vacuum still comprising the steps of:

(1) admitting a quantity of liquid to a pre-chamber from a supply;
(2) sealing the pre-chamber from the supply;
(3) controlling the temperature and/or pressure in the pre-chamber to remove volatile components from a residual liquid;
(4) transferring at least some of the residual liquid to said evaporator, and
(5) repeating steps 1 to 4.

According to a second aspect the invention consists in a continuous still comprising evaporator means, condensor means, means to maintain the evaporator at a sub-atmospheric pressure, evaporator feed means including a pre-chamber, means for repetitively admitting a liquid to the pre-chamber from a supply, means for reducing pressure in the pre-chamber whereby to extract volatiles and/or gas from liquid in the pre-chamber, and means for transferring at least a part of the residual liquid from the pre-chamber to the evaporator.

In preferred embodiments the pre-chamber is of small volume in comparison with the evaporator. The means for repetitively admitting a liquid to the pre-chamber includes a solenoid valve under the control of an electronic timer. Transfer of the liquid from the pre-chamber to the evaporator is accomplished by periodically equilibrating the pressure in the pre-chamber ullage space with the pressure in the evaporator chamber and allowing the liquid level in the pre-chamber to equilibrate with the liquid level in the evaporator.

BRIEF DESCRIPTION OF DRAWINGS

An embodiment of the invention will now be described by way of example only with reference to the accompanying drawings wherein.

PREFERRED EMBODIMENT OF INVENTION

Figure 1:
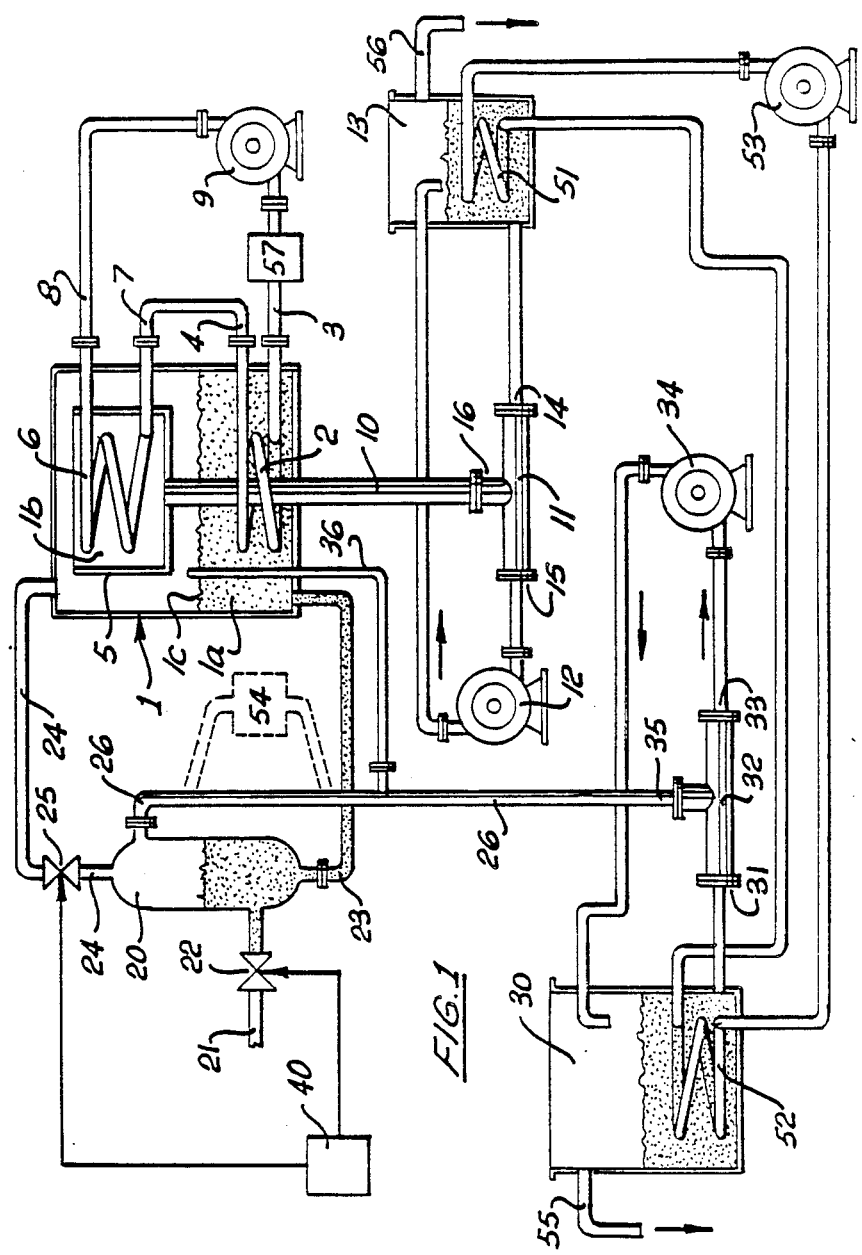
FIG. 1 is a schematic diagram illustrating an embodiment of the invention.

With reference to FIG. 1 there is show schematically a continuous distillation apparatus according to the invention The apparatus comprises a chamber 1 having an evaporator section 1a and a condensor section 1b. Evaporator section 1a is provided with a heat exchange coil 2 having a Freon refrigerant inlet 3 and a Freon refrigerant outlet 4. Condensor section 1b in the upper part of chamber 1 has a condensate collector 5 surrounding a condensor coil 6 having a refrigerant inlet 7 communicating with refrigerant outlet 4 through a suitably sized capillary tube or thermal expansion valve and a refrigerant outlet 8 communicating with refrigerant compressor 9. The refrigerant heat exchange circuit is completed by communication between pump 9 and refrigerant inlet 3. A heat exchanger 57 is preferably provided between pump 9 and inlet 3 to remove excess heat from the circuit. The refrigerant circuit supplies heat to the evaporator and extracts heat from the condenser and constitutes a refrigeration system having its condensing coils 6 in the water evaporator and its evaporative coils 2 in the water condenser. The system is operated at within a temperature range and mass flow such that most of the heat transfer to and from the refrigerant system is latent heat.

Liquid in evaporator 1a is maintained substantially at a level 1c. The temperature and pressure in evaporator 1a are such that under normal operating conditions heat exchange takes place between water in the still and refrigerant in the refrigerant circuit, the water vaporising and water vapor condensing on heat exchange coil 6.

Condensate from heat exchange coil 6 is removed via collector 5 via product entrainment device for example line 10 communicating with the low pressure (suction) port 16 of an extractor 11 or eductor. Product distillate is circulated via pump 12 from product blowdown tank 13 into inlet 14 of extractor 11 and from outlet 15 of extractor 11 back to product blowdown tank 13. Suction from low pressure port 16 removes distillate from collector 5 and contributes to pressure reduction in chamber 1. Extractor 11 together with pump 12 and tank 13 constitute a "product circuit". Product overflow is taken off through pipe 56.

Untreated water from a feed water blowdown reservoir 30 is circulated to inlet 31 of an entrainment device for example an extractor or eductor 32 or an entrainment pump and from outlet 33 of the entrainment device via pump 34 back to the feed water blowdown reservoir 30 thus drawing a high vacuum at low pressure port 35 of entrainment device 32. Low pressure port 35 is in communication with overflow tube 36 so that if liquid level in chamber 1 rises above overflow tube 36 the excess is returned to feed water blowdown reservoir 30. Vacuum drawn from low pressure port 35 also contributes to maintenance of low pressure in chamber 1. Overflow from blowdown reservoir 30 is fed to waste storage by pipe 55.

Feed water from reservoir 30 and/or another supply is admitted either directly or through a spray nozzle via first feed line 21 and solenoid valve 22 to a low pressure pre-chamber 20 which is of small volume in comparison with chamber 1. A second feed line 23 communicates between the lower part of chamber 20 and a lower part of evaporator 1a.

An equilabrating tube 24 provided with a solenoid valve 25 communicates between the upper part or ullage of pre-chamber 20 and chamber 1b.

A vacuum line 26 communicates between pre-chamber 20 (at a point between the liquid level and solenoid valve 25) and low pressure port 35 of the feed water blowdown circuit.

In use solenoid valves 22 and 25 are controlled by an electronic controller 40 to be described hereinafter to achieve the following operation:

Initially both solenoid valves 22 and 25 are closed and pre-chamber 20 is at reduced pressure. A sequence controller then opens valve 22 for a short time interval and feed water is drawn into pre-chamber 20. Valve 22 then closes. Because pre-chamber 20 is at low pressure volatiles in the feed water contained in the pre-chamber vaporise and air is disentrained. The air and volatiles are removed via vacuum line 26, low pressure port 35, and are released to atmosphere in blowdown tank 30 (or, if desired, may be collected for example by a cold trap, absorption chamber or a condensor 54 on vacuum line 26 illustrated in dotted form on the drawing).

After a timed interval sufficient to permit removal of volatiles from the charge in pre-chamber 20 controller 40 causes solenoid 25 to open allowing the pressure in pre-chamber 20 to equilibrate with the pressure in chamber 1. The liquid level in pre-chamber 20 then equilibrates with the liquid level in chamber 1 that is to say water free of volatiles is drawn from pre-chamber 20 into evaporator 1a of chamber 1 to a level to make up water removed from chamber 1 as distillate. Controller 40 next closes solenoid valve 25 and after a timed delay the controller cycle recommences.

In the embodiment described controller 40 consists of four timers. One timer controls the sequence of operations, a second times the period during which solenoid 25 remains open, a third controls the period during which solenoid 22 remains open and the fourth timer provides a time delay between the close of solenoid 25 and the opening of solenoid 22 whereby to remove any possibility of both valves being opened at once.

It will be understood that other control means could be used to produce the desired sequence. If desired, solenoid valves may also be provided on second feed line 23 and/or on vacuum line 26 but such valves are not essential.

The embodiment described enables volatiles to be removed from the feed water while permitting continuous distillation of the water in the still. The volatiles are separated and kept separate from the distillate. Removal of air and volatiles from the feed improves heat transfer in the main distillation chamber.

The embodiment also allows the amount of feed to the process chamber to be selected according to the quality of the feed water and the process capacity.

If desired, the vacuum and temperatures in pre-chamber 20 may be controlled to differ from that in main chamber 1. For example pre-chamber 20 may be heated by a heating element 20a almost to the boiling point of water. The pre-chamber may be used to isolate a volatile fraction. Several pre-chambers may be employed in series each having a temperature and pressure selected to isolate a pre-determined volatile fraction if preferred.

Figure 2:
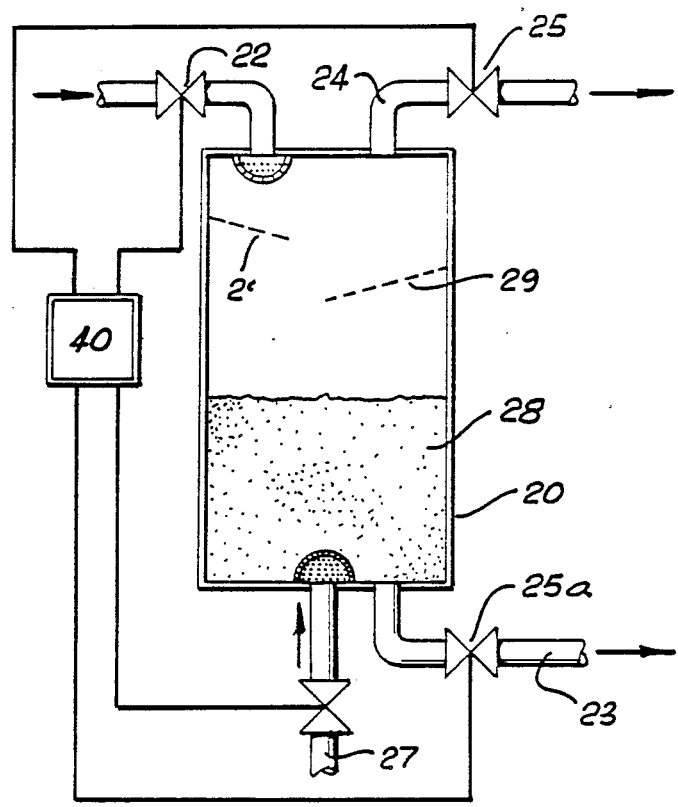
FIG. 2 is a schematic diagram showing a second embodiment of a portion of the apparatus of FIG. 1.

Another embodiment of the prechamber will now be described with reference to FIG. 2 wherein parts having a function corresponding to parts shown in FIG. 1, are identified by corresponding numerals.

A solenoid valve 25A is installed on line 23 and acts in parallel with valve 25 to isolate prechamber 20 from main chamber 1. Air or other suitable gasses may then be introduced to prechamber 20 via a gas line 27 and nozzles 28, the gas being used to facilitate separation of selected volatiles.

Advantageously, to further facilitate disentrainment of volatiles, liquid may be admitted to prechamber 20 as a spray via one or more nozzles 22A and prechamber 20 may be provided with transverse baffles 29.

In the preferred embodiment of the invention a second standard package Freon refrigerant circuit is provided having a heat exchanger 51 situated in the product blowdown tank connected in series with a heat exchanger 52 situated in blowdown tank 30 via an intermediate compressor 53.

The second refrigerant circuit chills the recirculating feed water to the vacuum drawing entrainment device 32 to the temperature which provides the selected vacuum. Thus the temperature control of water in blowdown tank 30 determines the vapor pressure enabling a low pressure in device 32 to be maintained in the still so that less heat energy input is required to secure a given boil rate than would be required at a higher pressure and temperature and enabling recovery of waste heat from the product water.

As will be understood by those skilled in the art from the teaching hereof the invention may be embodied in other forms and may be utilized for the separation of organic liquids one from another as well as for water purification.

I claim:

1. A method for pretreating a liquid to be supplied to an evaporator of a continuous vacuum still which vaporizes liquid to produce a vapor and condenses said vapor to produce a distillate, said method comprising the steps of:
    (1) admitting a quantity of liquid to a pre-chamber from a supply;
    (2) sealing the pre-chamber from the supply;
    (b 3) controlling the temperature and/or pressure in the pre-chamber to remove volatile components from a residual liquid;
    (4) transferring at lest some of the residual liquid to said evaporator, and
    (5) repeating the steps 1 to 4 while maintaining the evaporator and said distillate in isolation from said removed volatile components.

2. A method according to claim 1 wherein the pre-chamber is of small volume in comparison with the evaporator.

3. A method according to claim 1 wherein steps 1 and 2 are conducted repetitively and automatically by a timer controlled valve.

4. A method according to claim 1 wherein the liquid admitted to the prechamber in step 1 is exposed during step 3 to a sub-atmospheric pressure for a predetermined time interval.

5. A method according to claim 1 wherein step 4 is conducted by periodically allowing the pressure in the prechamber to equilibrate with the pressure in the evaporator and by allowing the level of liquid in the prechamber to equilibrate with the level of liquid in the evaporator.

6. A method according to claim 1 wherein the feed liquid is water containing volatile impurities more volatile than water.

7. A method according to claim 1 wherein the pre-chamber is maintained at a temperature which is different from the evaporator temperature.

8. A method according to claim 1 wherein further including the step of introducing a gas into the pre-chamber to sparge the liquid contained therein.

9. A method according to claim 1 wherein pressure in the prechamber is reduced by means of an entrainment device.

10. A continuous still comprising evaporator means for vaporizing liquid to produce a vapor, condensor means for condensing said vapor to produce a distillate, first means to maintain the evaporator at a sub-atmospheric pressure, evaporator feed means including a pre-chamber, means for repetitively admitting a liquid to the pre-chamber from a supply, second means for reducing pressure in the pre-chamber whereby to extract volatiles and/or gases from the liquid in the pre-chamber in isolation from the evaporator and said distillate, means for removing extracted volatiles and/or gases from the prechamber, and means for transferring at least part of the resultant residual liquid from the pre-chamber to the evaporator.

11. Apparatus according to claim 10 wherein the means for maintaining the evaporator at sub-atmospheric pressure is an entrainment device.

12. Apparatus according to claim 10 wherein the evaporator is a chamber and the pre-chamber is of small volume in comparison with the evaporator.

13. Apparatus according to claim 10 wherein the liquid is admitted to the pre-chamber from a supply via a line including a valve controlled for repetitive operation by a timer.

14. Apparatus according to claim 10 wherein the pre-chamber communicates with the evaporator at below the normal liquid level in each.

15. Apparatus according to claim 10 wherein means are provided for communicating the ullage space in the pre-chamber with the ullage space in the evaporator via a valve which is controlled by a second timer.

16. Apparatus according to claim 10 wherein the liquid is admitted from the supply to the prechamber via a spray nozzle.

17. Apparatus according to claim 16 wherein the spray is directed towards a transverse baffle.

18. Apparatus according to claim 10 having a distillate reservoir means for collecting a distillate which has been condensed by the condensor means, said apparatus having a blowdown reservoir which is in heat exchange communication with the distillate reservoir means.

* * * * *